US012678806B2

(12) United States Patent
Wu et al.

(10) Patent No.: US 12,678,806 B2
(45) Date of Patent: Jul. 14, 2026

(54) NOZZLE GASKET AND NOZZLE STRUCTURE FOR PURGE LOAD PORT

(71) Applicant: Taiwan Semiconductor Manufacturing Co., Ltd., Hsinchu (TW)

(72) Inventors: Cheng-Lung Wu, Hsinchu (TW); Yang-Ann Chu, Hsinchu (TW); Hsu-Shui Liu, Hsinchu (TW); Jiun-Rong Pai, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 143 days.

(21) Appl. No.: 18/484,339

(22) Filed: Oct. 10, 2023

(65) Prior Publication Data

US 2025/0114803 A1 Apr. 10, 2025

(51) Int. Cl.
*B05B 1/00* (2006.01)
*B05B 13/02* (2006.01)

(52) U.S. Cl.
CPC .............. *B05B 1/002* (2018.08); *B05B 13/02* (2013.01)

(58) Field of Classification Search
CPC ................................ B05B 1/002; B05B 13/02
See application file for complete search history.

(56) References Cited

U.S. PATENT DOCUMENTS 7,328,727 B2 * 2/2008 Tieben .............. H01L 21/67379 141/11
10,217,656 B2 * 2/2019 Murata ............. H01L 21/67775

FOREIGN PATENT DOCUMENTS

| | | | |
|---|---|---|---|
| CN | 101683650 | A | 3/2010 |
| TW | 201634135 | A | 10/2016 |
| TW | M609936 | U | 4/2021 |

* cited by examiner

*Primary Examiner* — Donnell A Long
(74) *Attorney, Agent, or Firm* — Seed IP Law Group

(57) ABSTRACT

A plurality of purge nozzles of a purge load port include a nozzle gasket and a nozzle structure to inject a purging fluid into and through an internal chamber of a container (e.g., a FOUP) that is configured to, in operation, transport wafers or workpieces between various locations within a FAB. The nozzle gasket includes a deformable structure that abuts against a surface of a nozzle structure and a sealing structure opposite to the deformable structure that forms a seal between the container and the nozzle gasket. A nozzle hole of a nozzle of the nozzle structure includes a threaded region or portion that is configured to receive a threaded stopper structure to seal off the nozzle hole.

20 Claims, 14 Drawing Sheets

NOZZLE GASKET AND NOZZLE STRUCTURE FOR PURGE LOAD PORT

BACKGROUND

In transporting of wafers and workpieces within a semiconductor manufacturing plant (FAB), one or more containers (e.g., front opening unified pod or front opening universal pod (FOUP)) are utilized to transport the wafers and workpieces for processing into respective various electronic components (e.g., semiconductor die, integrated circuits, or some other similar or like type of electronic component that may be manufactured within the FAB). These containers are transported by a transport system such as an overhead transport system (OHT) between various processing tools for processing of the wafers and workpieces into various electrical components. One or more purge load ports are present on which the containers are positioned, loaded, and mounted onto such that a purging fluid is ejected from the purge load ports at or into the containers to clean respective surfaces of the containers. The containers are cleaned as overtime debris, contaminants, or left over particulates build up on respective surfaces of the containers. At least some of these respective surfaces delimit internal chambers of the containers in which the workpieces and wafers are inserted into when being transported between various processing tools and locations within the FAB.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
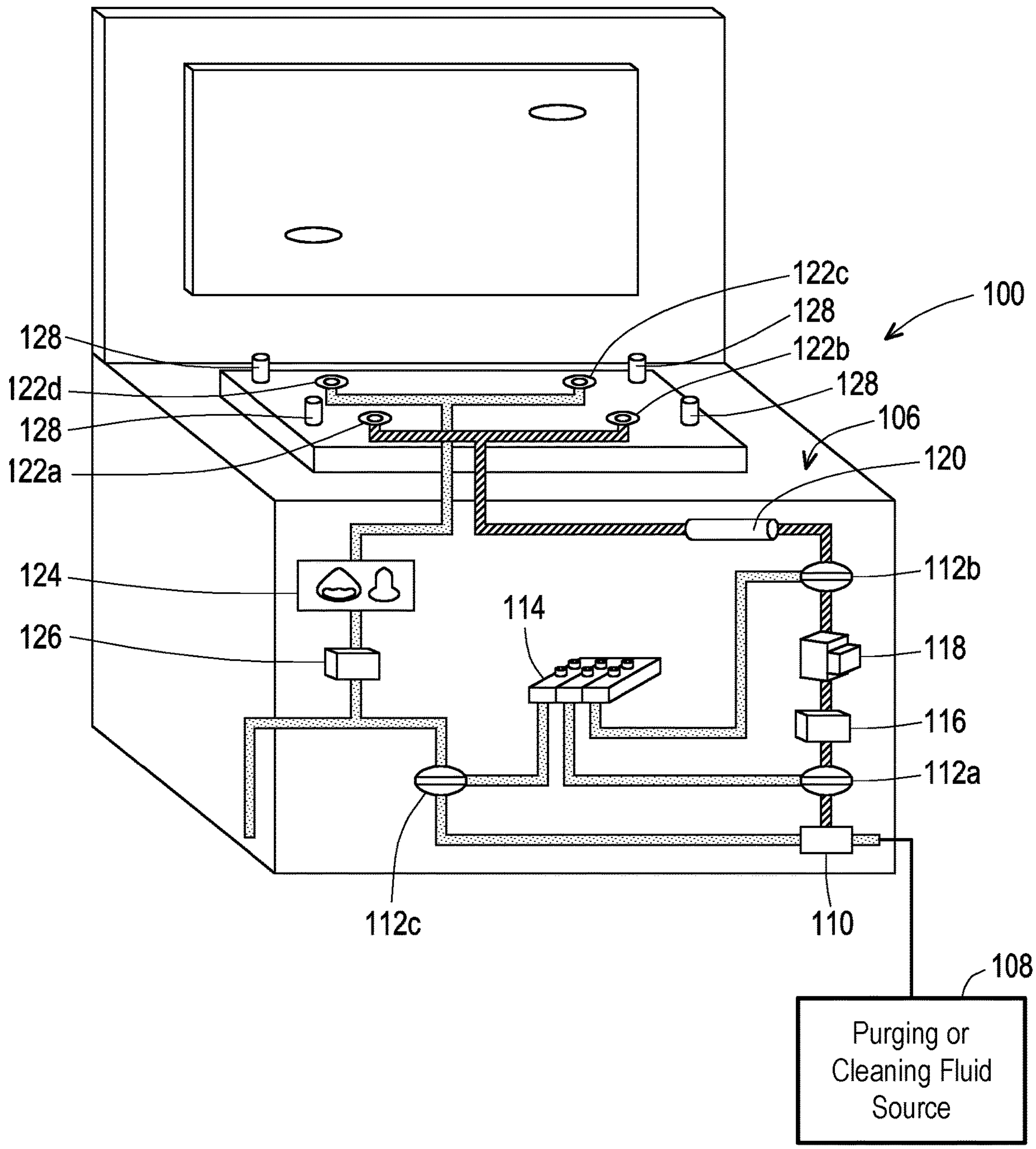
FIG. 1 is a perspective view of a purge load port, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Generally, integrated circuits are manufactured utilizing wafers or workpieces (e.g., semiconductor wafers or workpieces, silicon wafers or workpieces, etc.) that are transported throughout a semiconductor manufacturing plant (FAB) between various processing tools and locations within the FAB to manufacture electronic components (e.g., semiconductor dice, integrated circuits, or other similar or like electronic components that may be manufactured within a FAB). A plurality of containers are utilized to transport the wafers or workpieces between the various processing tools and locations within the FAB. The plurality of containers may be front opening unified pods or front opening universal pods (FOUPs) that are configured to, in operation, receive a number of the wafers or workpieces. The plurality of containers are transported by an overhead transport system (OHT) within the FAB between the various processing tools and locations within the FAB. As the plurality of containers are utilized repeatedly to transport the wafers and workpieces between these various processing tools and locations residual debris, contaminants, or particulates build up on respective surfaces of the plurality of containers. At least some of these respective surfaces delimit respective internal chambers of the plurality of containers.

After being utilized for a selected period of time, a first container of the plurality of containers is cleaned by being positioned, mounted, or loaded onto a purge load port such that a purging or cleaning fluid is ejected from one or more air purge nozzles of the purge load port into the respective internal chamber of the first container. The ejection of the purging fluid from the one or more air purge nozzles into the respective internal chamber of the first container purges or cleans the respective surfaces and the respective internal chamber of the first container by removing the residual debris, contaminants, or particulars built up on the respective surfaces or within the respective internal chamber of the first container. This process is repeated over and over again to continuously clean various respective surfaces and respective internal chambers of various containers that are utilized to transport wafers and workpieces throughout the FAB. However, when the purging fluid is ejected from the air purge nozzle, an upper end of a nozzle gasket sealing the air purge nozzle with an inlet of the first container in fluid communication with the respective internal chamber of the first container vibrates. This vibration, which may be referred to as "beading," causes the container to shift on the purge load port. This shifting of the container due to the vibration or deformation of the upper end of the nozzle gasket results in some of the purging fluid escaping or leaking from a seal between the nozzle gasket and the first container. This escaping or leaking of the purging fluid increases costs as the escaped or leaked purging fluid is wasted instead of being ejected into the respective internal chamber of the first container.

In view of the above discussion, the present disclosure is directed to providing one or more embodiments of a nozzle gasket that prevents vibration that results in at least some of the purging fluid escaping or leaking instead of being injected into the respective internal chamber of the first container. In other words, preventing the vibration in the nozzle gasket that results in shifting of the first container when present on the nozzle gasket when injecting the purging fluid into the internal chamber of the container prevents or reduces the likelihood of the purging fluid escaping or leaking from a seal between the nozzle gasket and the first container present on the nozzle gasket. Preventing or reducing the escaping or leaking of the purging fluid decreases costs to operate and run the FAB with little or no of the purging fluid being wasted when purging or cleaning a respective internal chamber of the plurality of containers.

FIG. 1 is a perspective view of a purge load port 100, in accordance with some embodiments. The purge load port 100 is structured to receive a container 102 (see FIG. 2) such that an internal chamber 104 of the container 102 may be purged or cleaned by injecting a purging or cleaning fluid into the internal chamber 104 of the container 102. The container 102 may be a front opening unified pod or front opening universal pod (FOUP) configured to, in operation, receive a number of wafers or workpieces to be refined and processed by various processing tools within a semiconductor manufacturing plant (FAB). The purge load port 100 includes a reception region or surface 106 on which the container 104 is positioned, loaded, or mounted when purging or cleaning the internal chamber 104 of the container 102 utilizing the purge load port 100.

A purging fluid source 108 is in fluid communication with the purge load port 100. The purging or cleaning fluid source 108 provides a purging or cleaning fluid to the purge load port 100. The purging or cleaning fluid is generally a fluid in a gaseous state. For example, the purging or cleaning fluid such as CDA (clean dry air), which may include nitrogen, oxygen, argon, or some other type of purging or cleaning fluid or combination of purging or cleaning fluids that is injected into the internal chamber 104 of the container 102 to purge or clean the internal chamber 104 of the container 102.

A regulator 110 of the purge load port 100 is in fluid communication with the fluid source 108. The regulator 110 is configured to, in operation, regulate a flow of the fluid into and through the purge load port 100. A plurality of valves 112*a*, 112*b*, 112*c* are present within the purge load port 100 and are configured to, in operation, control the purging fluid passing through respective fluid lines and connections within the purge load port 100. The plurality of valves 112*a*, 112*b*, 112*c* includes a first valve 112*a*, a second valve 112*b*, and a third valve 112*c*. The first, second, and third valves 112*a*, 112*b*, 112*c* may be pneumatic valves or may be some other similar or like type of valve that is suitable for controlling the purging fluid passing through respective fluid lines and connections of the purge load port 100.

A solenoid valve 114 is in fluid communication with the first, second, and third valves 112*a*, 112*b*, 112*c*. The solenoid valve 114 is configured to, in operation, is utilized to control or supply power to open and close the first, second, and third valves 112*a*, 112*b*, 112*c*. For example, various ones or all of the first, second, and third valves 112*a*, 112*b*, 112*c* may be opened or closed to introduce the CDA through various ones or all of the first, second, and third valves 112*a*, 122*b*, 112*c*.

A pressure sensor or meter 116 is present along a respective fluid line that extends from the first valve 112*a* to the second valve 112*b*. The pressure sensor 116 is configured to, in operation, monitor and collect data with respect to a pressure of the purging fluid as the purging fluid passes through the respective fluid line between the first valve 112*a* and the second valve 112*b*.

A first flow sensor or meter 118 is present along the respective fluid line that extends from the first valve 112*a* to the second valve 112*b*. The first flow sensor 118 is present between the pressure sensor 116 and the second valve 112*b*. The first flow sensor 118 is configured to, in operation, monitor and collect data with respect to a flow or flow speed of the purging fluid as the purging fluid passes through the respective fluid line between the first valve 112*a* and the second valve 112*b*.

Figure 2:
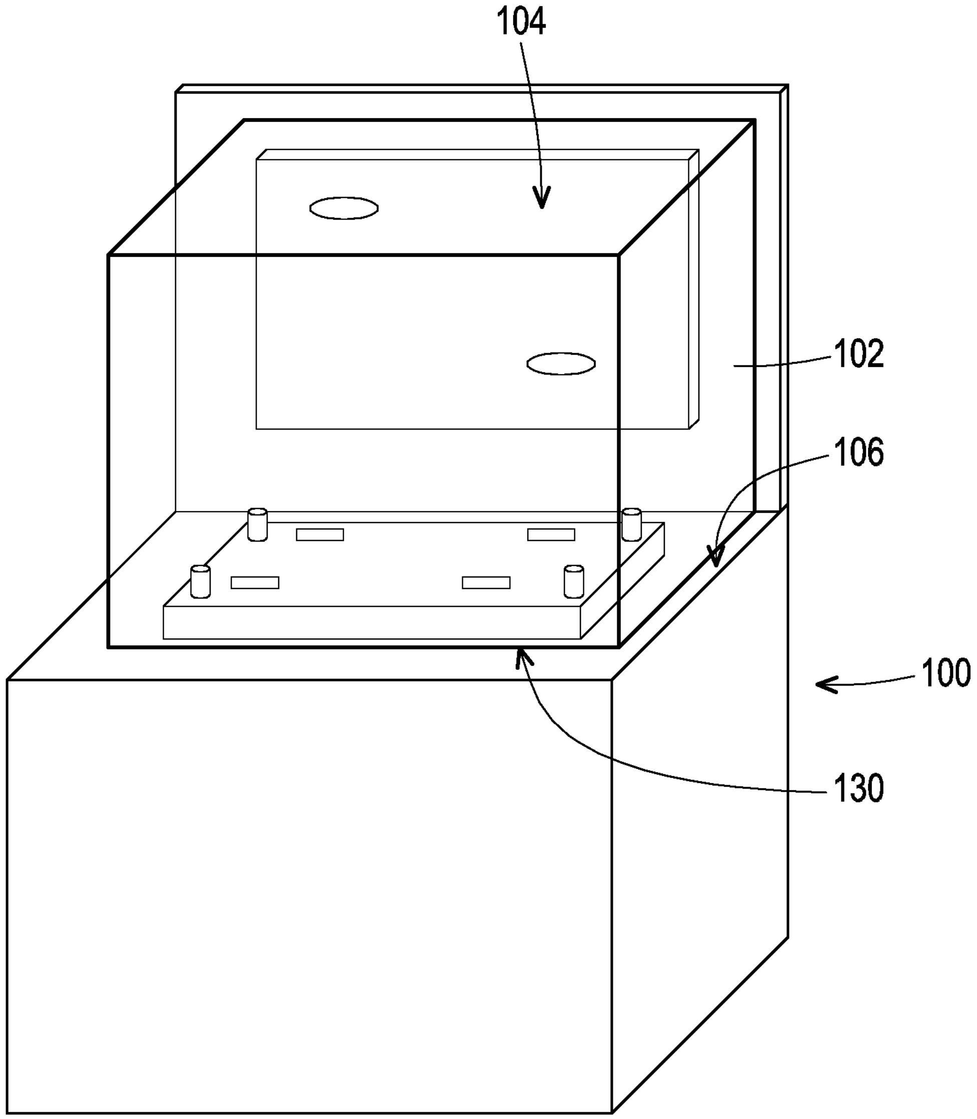
FIG. 2 is a perspective view of the purge load port as shown in FIG. 1 with a container (e.g., a FOUP) mounted on the purge load port, in accordance with some embodiments.

A filter 120 is in fluid communication with the second valve 112*b* through a respective fluid line, and the filter 120 is between the second valve 112*b* and at least one of a plurality of purge nozzles 122*a*, 122*b*, 122*c*, 122*d*. The filter 120 is configured to, in operation, filter debris, contaminants, or particulates from the purging fluid passing through the purge load port 100. As shown in FIG. 1, a first pair of nozzles 122*a*, 122*b* of the plurality of purge nozzles 122*a*, 122*b*, 122*c*, 122*d* are in fluid communication with the filter 120 through a respective fluid line. In this embodiment, as shown in FIG. 1, the first pair of nozzles 122*a*, 122*b* of the plurality of purge nozzles 122*a*, 122*b*, 122*c*, 122*d* are injection or inlet purge nozzles through which the purging fluid is injected into the internal chamber 104 of the container 102 to purge or clean the internal chamber 104 of the container with the purging fluid passing through the purge load port 100. In this embodiment as shown in FIG. 2, a second pair of nozzles 122*c*, 122*d* of the plurality of purge nozzles 122*a*, 122*b*, 122*c*, 122*d* are egress or outlet purge nozzles through which the purging fluid exits the internal chamber 104 of the container 102 and back into the purge load port 100 after passing through the internal chamber 104 of the container 102. In some alternative embodiments, various combinations of the plurality of purge nozzles 122*a*, 122*b*, 122*c*, 122*d* may be injection or inlet purge nozzles and egress or outlet purge nozzles that allow for the purging fluid to enter and exit the internal chamber 104 of the container 102 when purging or cleaning the internal chamber 104 of the container 102.

A humidity and temperature sensor or meter 124 is in fluid communication with the second pair of nozzles 122*c*, 122*d* of the plurality of purge nozzles 122*a*, 122*b*, 122*c*, 122*d* through a respective fluid line between the second pair of nozzles 122*c*, 122*d* of the plurality of purge nozzles 122*a*, 122*b*, 122*c*, 122*d* and the humidity and temperature sensor 124. The humidity and temperature sensor or meter 124 is configured to, in operation, monitor or collect data with respect to the humidity and temperature of the purging fluid passing through the purge load port 100.

A second flow sensor or meter 126 is in fluid communication with the humidity and temperature sensor or meter 124 through a respective fluid line between the humidity and temperature sensor 124 and the second flow sensor 126. The second flow sensor 126 is configured to, in operation, monitor and collect data with respect to a flow or flow speed of the purging fluid as the purging fluid passes through the purge load port 100.

While not shown, a controller (not shown) is in electrical communication with respective features of the purge load port 100 such that the controller may control or collect data from the various features of the purge load port 100. For example, the controller is in electrical communication with the plurality of valves 112*a*, 112*b*, 112*c* and provides control signals to the plurality of valves 112*a*, 112*b*, 112*c* for opening and closing the plurality of valves 112*a*, 112*b*, 112*c*, is in electrical communication with the solenoid valve 114 and provides control signals to the solenoid valve 114 for opening and closing the solenoid valve 114, is in electrical communication with the first flow sensor 118, the pressure sensor 116, the humidity and temperature sensor 124, and the second flow sensor 126 to collect data with respect to the purging fluid passing through the purge load port 100 that may be utilized to control various operations of the purge load port 100. The controller may be in electrical communication with filter sensors (not shown) that monitor a status of efficiency of the filter 120 in filtering out debris, contaminants, or particulates from the purging fluid passing through the purge load port 100.

One or more guide structures or pins 128 are present at the reception region 106 that receives the container 102. In this embodiment as shown in FIG. 1, the one or more guide structures 128 are pins that protrude outward. The one or more guide structures 128 are present to and configured to, in operation, align respective inlets (not shown) of the container 102 with the first pair of nozzles 122*a*, 122*b* of the plurality of purge nozzles 122*a*, 122*b*, 122*c*, 122*d* and the respective outlets (not shown) of the container 102 with the second pair of nozzles 122*c*, 122*d* of the plurality of purge nozzles 122*a*, 122*b*, 122*c*, 122*d*. This alignment of the respective inlets and the respective outlets of the container 102, respectively, with the first pair of nozzles 122*a*, 122*b* and the second pair of nozzles 122*c*, 122*d* of the plurality of purge nozzles 122*a*, 122*b*, 122*c*, 122*d* allows for the purging fluid from to enter the internal chamber 104 and exit the internal chamber 104 when purging or cleaning the internal chamber 104 of the container 102. While not shown, the container 102 may include guide reception openings that are configured to, in operation, receive the one or more guide structures 128 such that the container 102 is properly positioned, loaded, or mounted onto the reception region 106 of the purge load port 100.

FIG. 2 is a perspective view of the purge load port 100 as shown in FIG. 1 with the container 102 (e.g., a FOUP) positioned, loaded, or mounted on the reception region 106 of the purge load port 100, in accordance with some embodiments. The internal chamber 104 within the container 102 is in fluid communication with the plurality of purge nozzles 122*a*, 122*b*, 122*c*, 122*d* through respective inlets and outlets (not shown) of the container that provide fluidic access to the internal chamber 104 within the container 102 when positioned, loaded, or mounted onto the purge load port 100. The container 102 includes a reception or mounting surface 130 that abuts the reception region 106 when the container 102 is positioned, loaded, or mounted onto the purge load port 100. The reception or mounting surface 130 is a lower surface of the container 102 based on the orientation of the container as shown in FIG. 2.

Figure 3A:
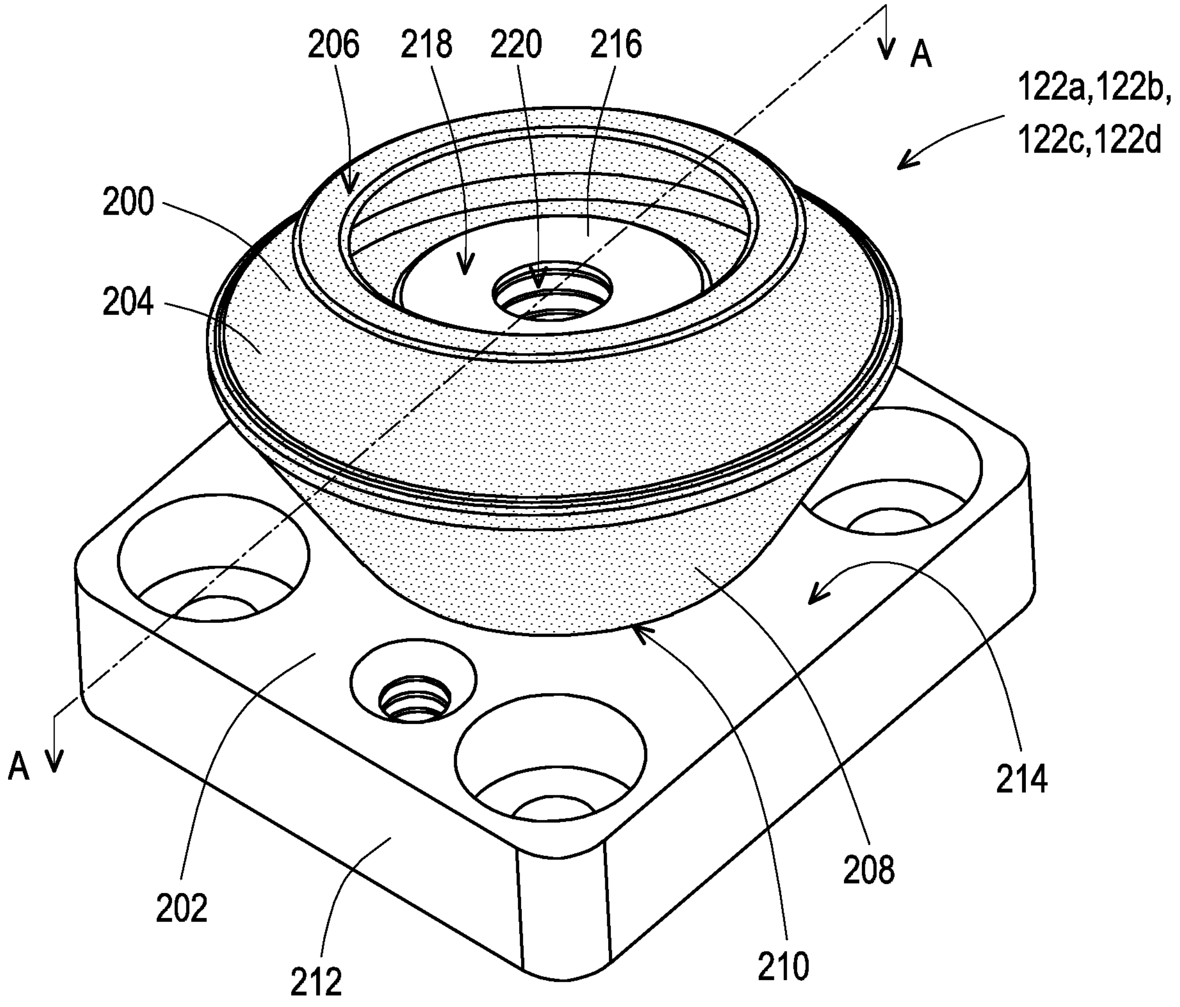
FIG. 3A is a perspective view of a nozzle gasket and a nozzle structure.

FIG. 3A is a perspective view of a nozzle gasket 200 and a nozzle or nozzle structure 202 that are usable at the plurality of purge nozzles 122*a*, 122*b*, 122*c*, 122*d* of the purge load port 100. However, as will become readily apparent in view of the following discussion with respect to FIGS. 3A-3C, the nozzle gasket 200 allows for at least some the purging fluid to escape or leak when the purging fluid from the purge load port 100 is being injected into the internal chamber 104 of the container 102. This escaping or leaking of the purging fluid increases cost when operating and running the FAB.

The nozzle gasket 200 is removably mounted or coupled to the nozzle structure 202. The nozzle gasket 200 includes a deformable structure 204 at a first end 206 of the nozzle gasket 200, which is an upper end of the nozzle gasket 200 based on the orientation as shown in FIG. 3A. The deformable structure 204 contacts the container 102 when the container 102 is positioned, loaded, or mounted on the reception region 106 of the purge load port 100. For example, the deformable structure 204 contacts the mounting surface 130 of the container 102 to form a seal between the respective outlet or inlet of the container overlapping and aligned with a corresponding purge nozzle of the plurality of purge nozzles 122*a*, 122*b*, 122*c*, 122*d*. The nozzle gasket 200 further includes a base structure 208 at a second end 210 of the nozzle gasket 200, which is a lower end of the nozzle gasket 200 based on the orientation as shown in FIG. 3A. The second end 210 of the nozzle gasket 200 is opposite to the first end 206 of nozzle gasket 200. The deformable structure 204 in FIG. 3A is in an undeformed state in which the container 102 is not present on the nozzle gasket 200 such that the deformable structure 204 of the nozzle gasket 200 is undeformed (i.e., not deformed).

The nozzle structure 202 includes a base 212 with a base surface 214 that abuts the second end 210 of the nozzle gasket 200 and includes a nozzle 216 that protrudes from the base surface 214 of the base 212. The nozzle 216 of the nozzle structure 202 is within the nozzle gasket 200 such that the nozzle gasket 200 extends around the nozzle 216. The nozzle 216 includes a third end 218 at which the nozzle 216 terminates.

The nozzle structure 202 further includes a nozzle opening or hole 220 that extends into the third end 218 of nozzle 216 and is an inlet or outlet through which the purging fluid may exit or enter, respectively. For example, as the first pair of nozzles 122*a*, 122*b* of the plurality of purge nozzles 122*a*, 122*b*, 122*c*, 122*d* eject the purging fluid, the corresponding ones of the nozzle holes 220 that correspond to the first pair of nozzles 122*a*, 122*b* are outlets for the purging fluid to exit, and, alternatively, as the second pair of nozzles 122*c*, 122*d* of the plurality of purge nozzles 122*a*, 122*b*, 122, 122*d* receive the purging fluid, the corresponding ones of the nozzles holes 220 that correspond to the second pair of nozzles 122*c*, 122*d* are inlets for the purging fluid to enter.

Figure 3B:
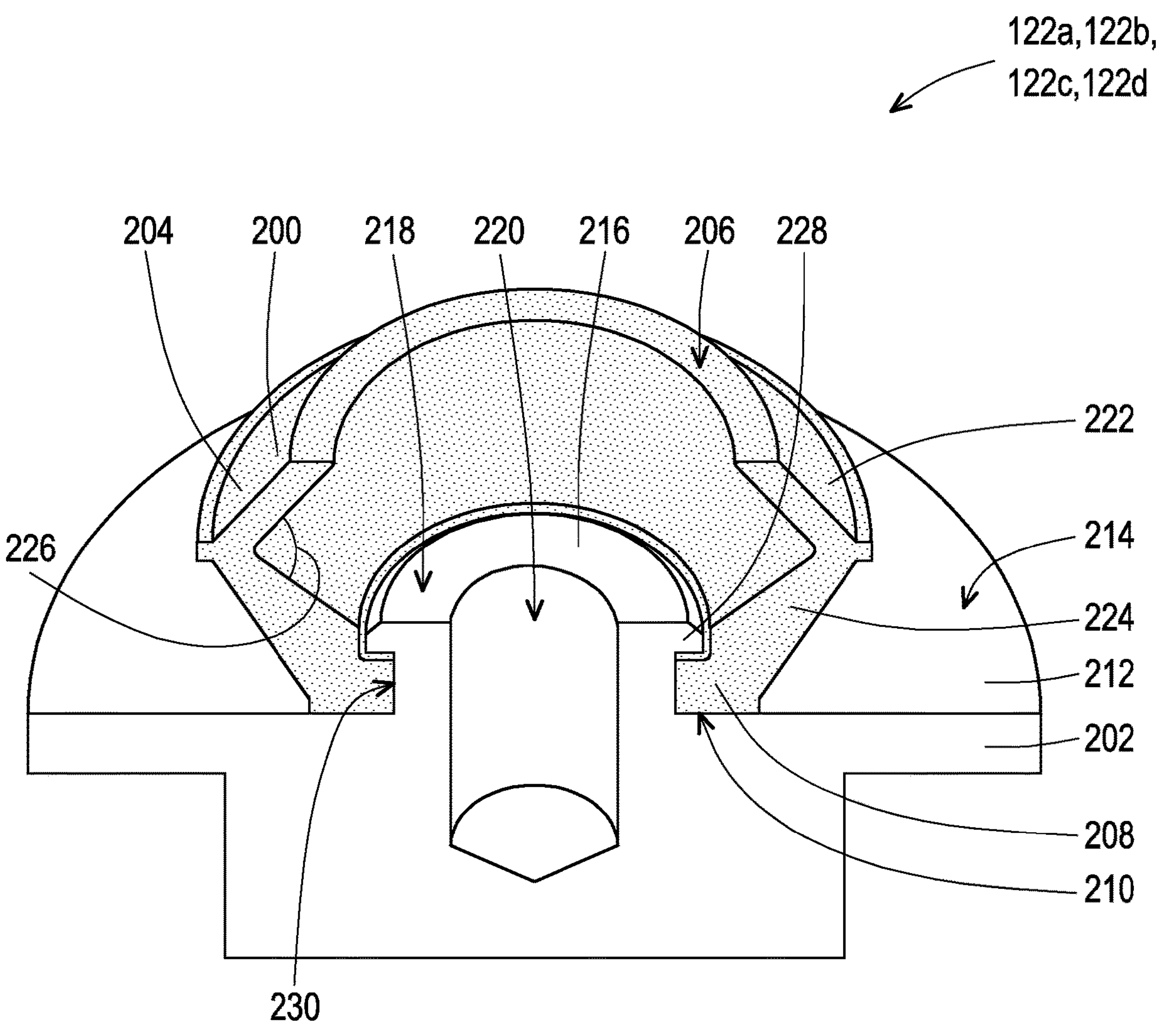
FIG. 3B is a cross-sectional, perspective view of the nozzle gasket in an undeformed state and the nozzle structure taken along line A-A as shown in FIG. 3A.

FIG. 3B is a cross-sectional, perspective view of the nozzle gasket 200 and the nozzle structure 202 taken along line A-A as shown in FIG. 3A. The nozzle gasket 200 is in the undeformed state in FIG. 3B, which is representative of when the container 102 is not present on the nozzle gasket 200 as the container 102 is not present on the reception region 106 of the purge load port 100.

The deformable structure 204 of the nozzle gasket 200 includes a first portion 222 and a second portion 224, and the first portion 222 and the second portion 224 are transverse to each other by a first angle 226. The first portion 222 extends from the first end 206 of the nozzle gasket 200 to the second portion 224 of the nozzle gasket 200. The second portion 224 extends from the first portion 222 to the base structure 208. In other words, the second portion 224 is between the first portion 222 and the base structure 208. The first portion 222 may be referred to as an upper portion, the second portion 224 may be referred to as an intermediate portion, and the base structure 208 may be referred to as a lower portion. When the first portion 222 and the second portion 224 are in the undeformed state, the first portion 222 and the second portion 224 are substantially straight relative to when the first portion 222 and the second portion 224 are in a deformed state (see FIG. 3C).

The nozzle 216 includes a lip portion 228 at the third end 218 of the nozzle 216. The base structure 208 of the nozzle gasket 200 is structured to be inserted into a space 230 between the lip portion 228 and the base surface 214 of the base 212. The base structure 208 interlocks with the lip portion 228 such that the nozzle gasket 200 is removably mounted or coupled to the nozzle 216 of the nozzle structure 202.

Figure 3C:
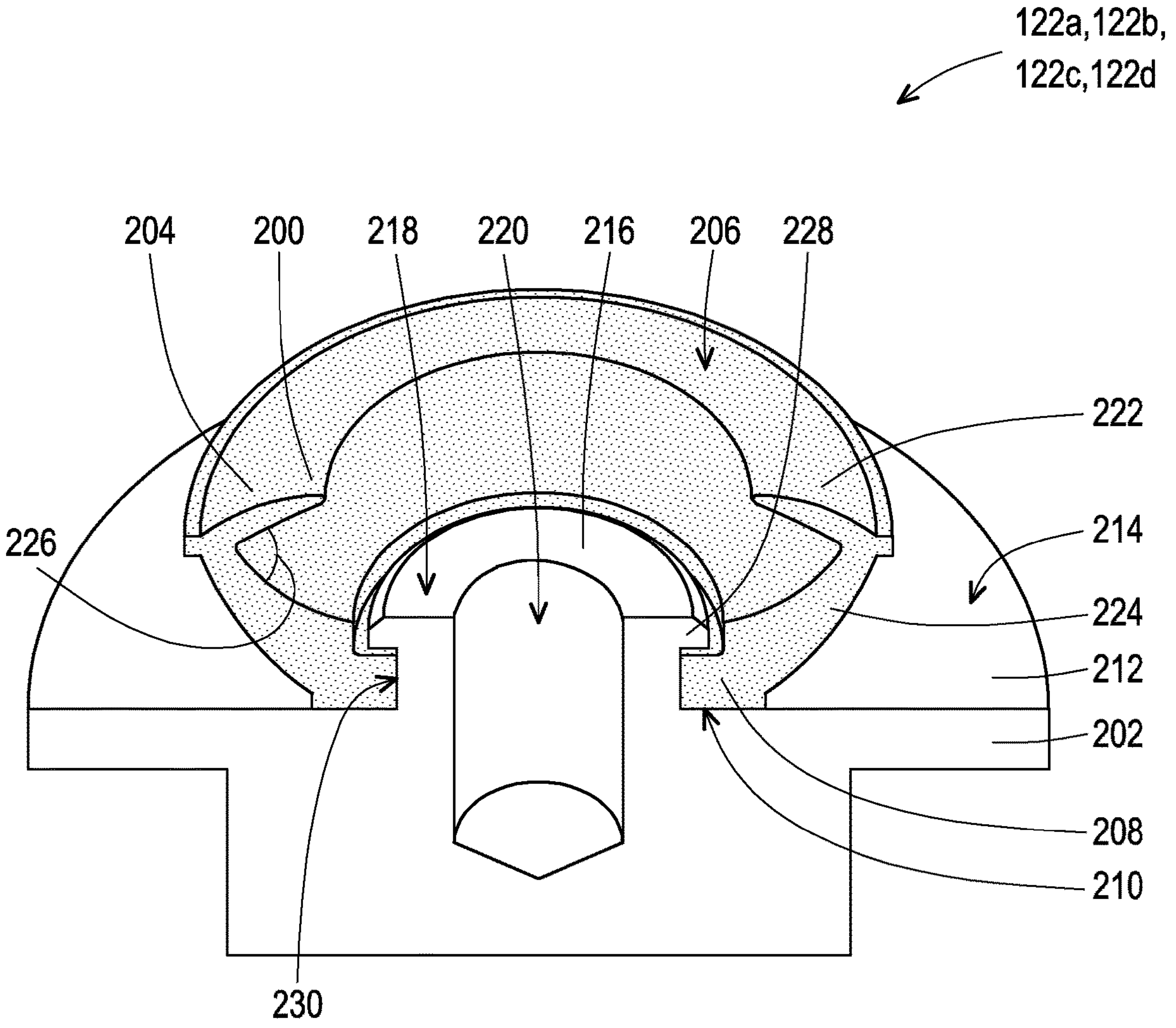
FIG. 3C is a cross-sectional, perspective view of the nozzle gasket in a deformed state and the nozzle structure taken along line A-A as shown in FIG. 3A.

FIG. 3C is a cross-sectional, perspective view of the nozzle gasket 200 and the nozzle structure 202 taken along A-A as shown in FIG. 3A. The nozzle gasket 200 is in the deformed state in FIG. 3C, which is representative of when the container 102 is present on the nozzle gasket 200 as the container 102 is present on the reception region 106 of the purge load port 100.

When the deformable structure 204 is in the deformed state as shown in FIG. 3C, the first portion 222 and the second portion 224 of the deformable structure 204 of the nozzle gasket 200 are pushed down by the container 102 due to the container 102 being present on the first portion 222 of the deformable structure 204 of the nozzle gasket 200. This downward force due to the weight of the container 102 on the nozzle gasket 200 when the container 102 is present on the reception region 106 of the purge load port 100 results in the first portion 222 and the second portion 224 both deforming and becoming curved as shown in FIG. 3C. When the first portion 222 and the second portion 224 are deformed and become curved, the first angle 226 reduces as compared to when the first portion 222 and the second portion 224 are in the undeformed state as shown in FIG. 3B.

As the deformable structure 204 is at the first end of the nozzle gasket 200, the deformable structure 204 forms a seal with the container 102 when the container 102 is present on the reception region 106 of the purge load port 100. Once the seal is formed between the nozzle gasket 200 and the container 102, the purging fluid is introduced into the internal chamber 104 of the container 102. As the purging fluid is introduced into the internal chamber 104 through the first pair of nozzles 122*a*, 122*b* of the plurality of purge nozzles 122*a*, 122*b*, 122*c*, 122*d*, the purging fluid passing through the deformable structure 204 in the deformed state causes vibration in the first portion 222 and the second portion 224 of the deformable structure 204. This vibration in the first and second portions 222, 224 causes the seal between the first end 206 of the nozzle gasket 200 with the container 102 to unseal for short periods of time allowing for at least some of the purging fluid to escape or leak between the first end of the nozzle gasket 200 and the container 102 into an environment external to the container 102 instead of being introduced into the internal chamber 104.

Similarly, the purging fluid is allowed to exit the internal chamber 104 through the second pair of nozzles 122*c*, 122*d* of the plurality of purge nozzles 122*a*, 122*b*, 122*c*, 122*d*, wherein the purging fluid passing through the deformable structure 204 in the deformed state causes vibration of the first portion 222 and the second portion 224. This vibration in the first and second portions 222, 224 causes the seal between the first end 206 of the nozzle gasket 200 with the container 102 to unseal for short periods of time allowing for at least some of the purging fluid to escape or leak between the first end 206 of the nozzle gasket 200 and the container 102 into an environment external to the container 102 instead of being introduced into the internal chamber 104.

The vibration caused by the purging fluid passing through the deformable structures 204 of the nozzle gaskets at the plurality of purge nozzles 122*a*, 122*b*, 122*c*, 122*d* cause small shifts in the position of the container 102 when present on the reception region 106 of the purge load port. These small shifts in the position of the container 102 may further cause or facilitate the seals between the nozzle gaskets 200 at the plurality of purge nozzles 122*a*, 122*b*, 122*c*, 122*d* to become unsealed for short periods of time to further cause or facilities escaping or leaking of the purging fluid into the environment external to the container 102 instead of being introduced into the internal chamber 104.

In view of the above discussion, the escaping and leaking of the purging fluid increases costs to operate or run the FAB as the purging fluid is wasted instead of purging or cleaning the internal chamber 104 of the container 102. As is readily apparent in view of the above discussion, the deformable structure 204 being present at the first end 206 of the nozzle gasket 200 such that the deformable structure 204 forms the seal between the nozzle gasket 200 and the container 102 results in at least some of the purging fluid escaping and leaking between the deformable structure 204 of the nozzle gasket 200 and the container 102.

When the container 102 is present on the deformable structure 204 of the nozzle gasket 200, the base structure 208 of the nozzle gasket 200 remains undeformed. When the container 102 is not present on the deformable structure 204 of the nozzle gasket, the base structure 208 of the nozzle gasket 200 remains undeformed. In other words, regardless of whether the container 102 is or is not present on the deformable structure 204 of the nozzle gasket 200, the base structure 208 remains undeformed.

Figure 4A:
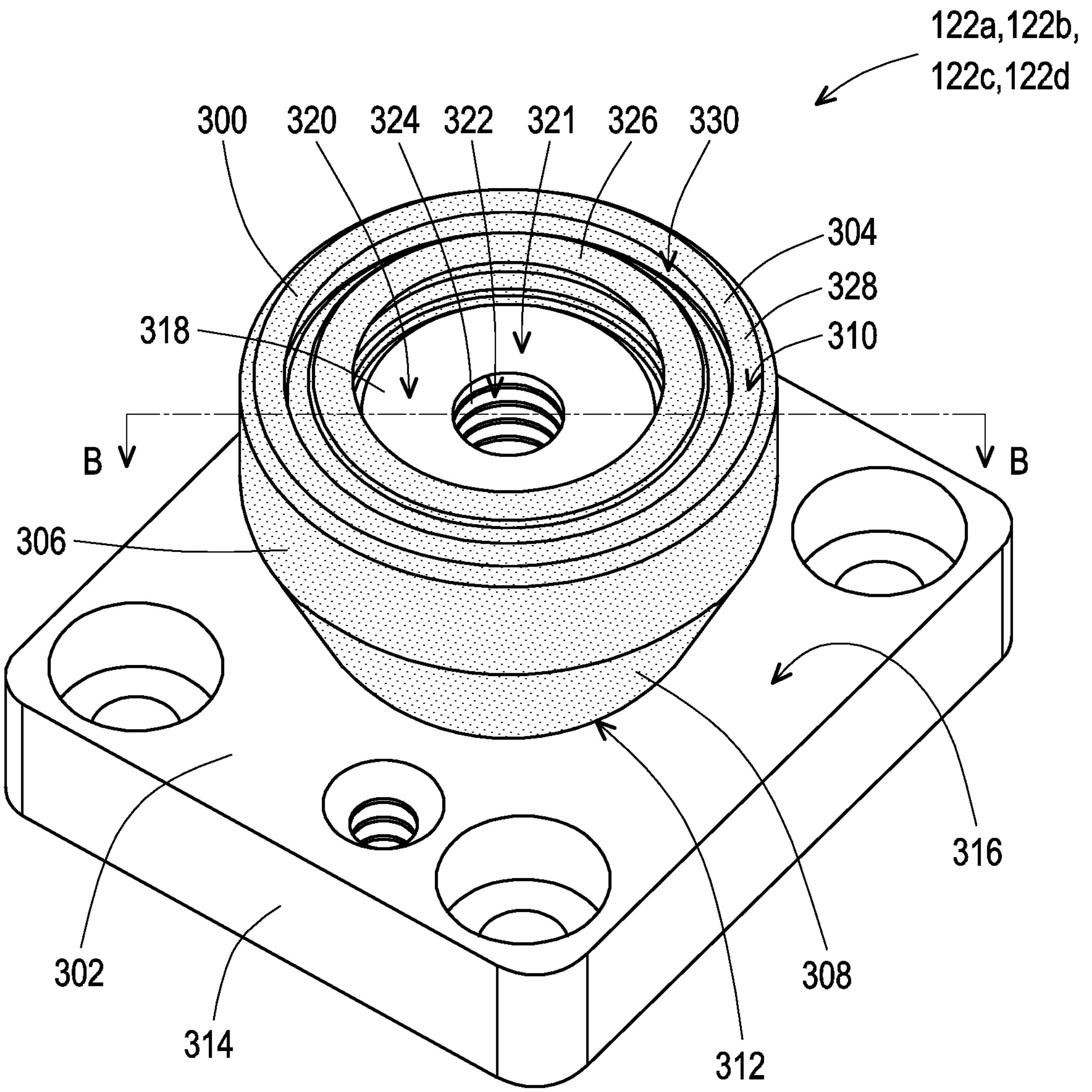
FIG. 4A is a perspective view of a nozzle gasket and a nozzle structure, in accordance with some embodiments.

FIG. 4A is a perspective view of a nozzle gasket 300 and a nozzle or nozzle structure 302, in accordance with some embodiments, that are usable at the plurality of purge nozzles 122*a*, 122*b*, 122*c*, 122*d* of the purge load port, in accordance with some embodiments. As will become readily apparent in view of the following discussion with respect to FIGS. 4A-4E, utilizing the nozzle gasket 300 and the nozzle structure 302, in accordance with some embodiments, instead of the nozzle gasket 200 and the nozzle structure 202 prevents or reduces the likelihood of the purging fluid escaping or leaking in the fashion as discussed earlier herein when the nozzle gasket 200 and the nozzle structure 202 are utilized. Preventing or reducing this likelihood of the escaping or leaking of the purging fluid by utilizing the nozzle gasket 300 and the nozzle structure 302 instead of the nozzle gasket 200 and the nozzle structure 200 reduces costs to operate and run the FAB.

The nozzle gasket 300 is removably mounted or coupled to the nozzle structure 302. The nozzle gasket 300 includes a sealing structure 304, a mounting structure 306, and a deformable structure 308. The sealing structure 304 is at a first end 310 of the nozzle gasket 300, which is at an upper end of the nozzle gasket 300 based on the orientation of the nozzle gasket 300 as shown in FIG. 4A. The sealing structure 304 contacts the container 102 when the container 102 is positioned, loaded, or mounted on the reception region 106 of the purge load port 100. For example, the sealing structure 304 contacts the mounting surface 130 of the container 102 to form a seal between the respective outlet or inlet of the container overlapping and aligned with a corresponding purge nozzle of the plurality of purge nozzles 122*a*, 122*b*, 122*c*, 122*d*. The deformable structure 308 of the nozzle gasket 300 is at a second end 312 of the nozzle gasket 300, which is at a lower end of the nozzle gasket 300 based on the orientation of the nozzle gasket 300 as shown in FIG. 4A. The second end 312 is opposite to the first end 310. The mounting structure 306 is between the first end 310 and the second end 312 and is between the sealing structure 304 and the deformable structure 308. The sealing structure 304 may be referred to as an upper portion, the mounting structure 306 may be referred to as an intermediate portion, and the deformable structure 308 may be referred to as a lower portion. The deformable structure 308 in FIG. 4A is in an undeformed state in which the container 102 is not present on the nozzle gasket 300 such that the deformable structure 308 of the nozzle gasket 300 is undeformed (i.e., not deformed).

The nozzle structure 302 includes a base 314 with a base surface 316 that abuts the second end 312 of the nozzle gasket 300 and includes a nozzle 318 that protrudes from base surface 316 of the base 314. The nozzle 318 of the nozzle structure 302 is within the nozzle gasket 300 such that the nozzle gasket 300 extends around the nozzle 318. The nozzle 318 includes a third end 320 at which the nozzle 318 terminates.

The nozzle structure 302 further includes a nozzle opening or hole 322 that extends into the third end 320 of the nozzle 318 and is an inlet or outlet through which the purging fluid may exit or enter, respectively. For example, as the first pair of nozzles 122*a*, 122*b* of the plurality of purge nozzles 122*a*, 122*b*, 122*c*, 122*d* eject the purging fluid, the corresponding ones of the nozzle holes 322 that correspond to the first pair of nozzles 122*a*, 122*b* are outlets for the purging fluid to exit, and, alternatively, as the second pair of nozzles 122*c*, 122*d* of the plurality of purge nozzles 122*a*, 122*b*, 122*c*, 122*d* receive the purging fluid, the corresponding ones of the nozzle holes 322 that correspond to the second pair of nozzles 122*c*, 122*d* are inlets for the purging fluid to enter. The nozzle holes 322 include a threaded region or portion 324 that is threaded and is configured to, in operation, receive a threaded structure such as a threaded structure of a threaded fastener (see FIGS. 7A and 7B).

The sealing structure 304 further includes a first seal portion 326 and a second seal portion 328 that are spaced apart from each other by a recess 330. As shown in this embodiment of the nozzle gasket as shown in FIG. 3A, the first and second seal portions 326, 328 are annular or ring portions and the recess 330 is an annular or ring recess.

Figure 4B:
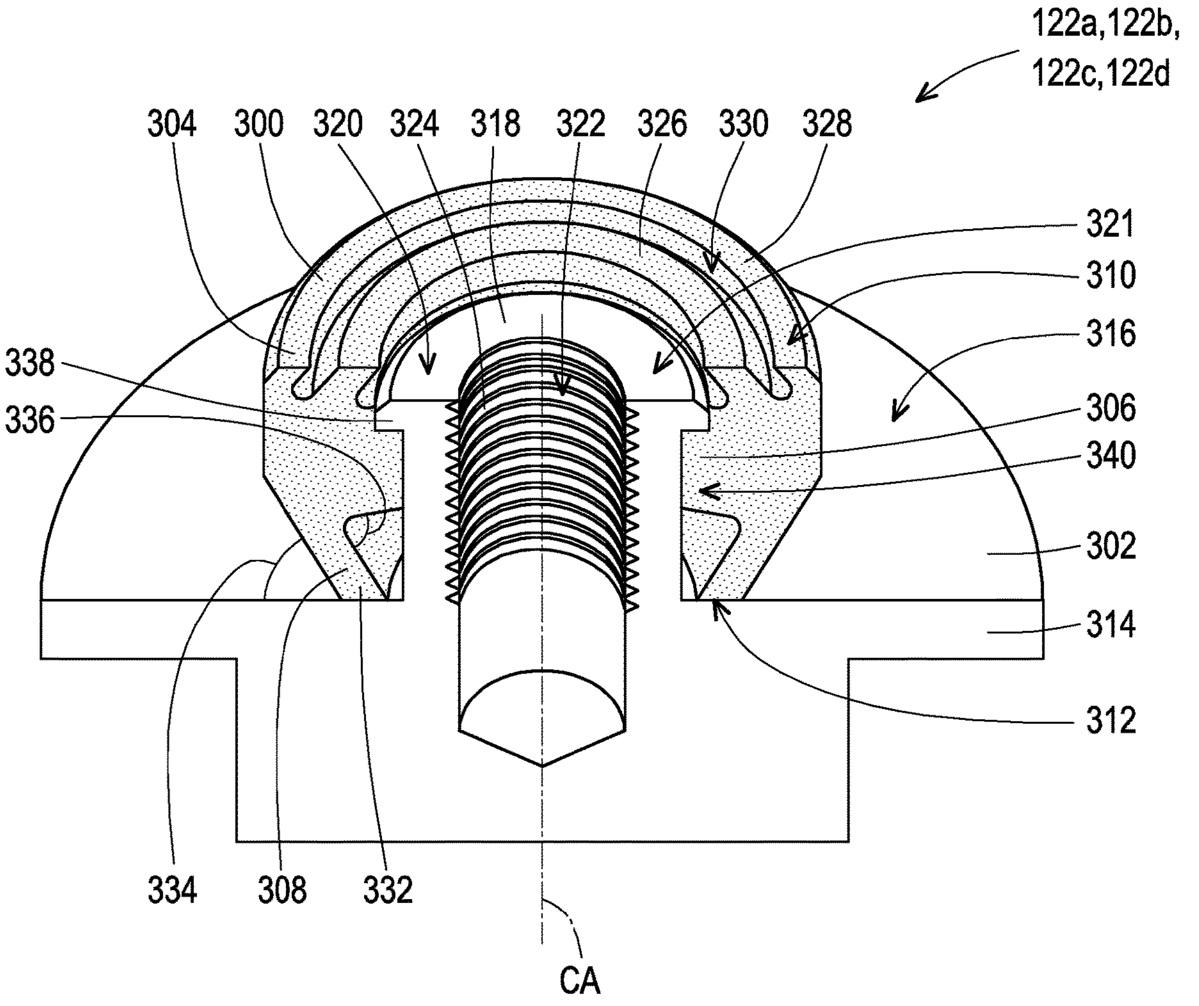
FIG. 4B is a cross-sectional, perspective view of the nozzle gasket in an undeformed state and the nozzle structure taken along line B-B as shown in FIG. 4A, in accordance with some embodiments.

FIG. 4B is a cross-sectional, perspective view of the nozzle gasket 300 and the nozzle structure 302 taken along line B-B as shown in FIG. 4A, in accordance with some embodiments. The nozzle gasket 300 is in the undeformed state in FIG. 4B, which is representative of when the container 102 is not present on the nozzle gasket 300 as the container 102 is not present on the reception region 106 of the purge load port 100.

The deformable structure 308 includes an angled portion 332 that is at a second angle 334 relative to the base surface 316 of the base 314. The angled portion 332 is transverse to the mounting portion 306 by a third angle 336. The angled portion 332 extends from the mounting portion 306 to the base surface 316 of the base 314. When the angled portion 332 of the deformable structure 308 is in the undeformed state, the angled portion 332 of the nozzle gasket 300 is substantially straight relative to when the angled portion 332 of the nozzle gasket 300 is in a deformed state (see FIG. 4C).

The nozzle 318 includes a lip portion or structure 338 at the third end 320 of the nozzle 318. The mounting structure 306 of the nozzle gasket 300 is structured to be inserted into a space 340 between the lip portion 338 and the base surface 316 of the base 314. The mounting structure 306 interlocks with the lip portion 338 such that the nozzle gasket 300 is removably mounted or coupled to the nozzle 318 of the nozzle structure 302.

Figure 4C:
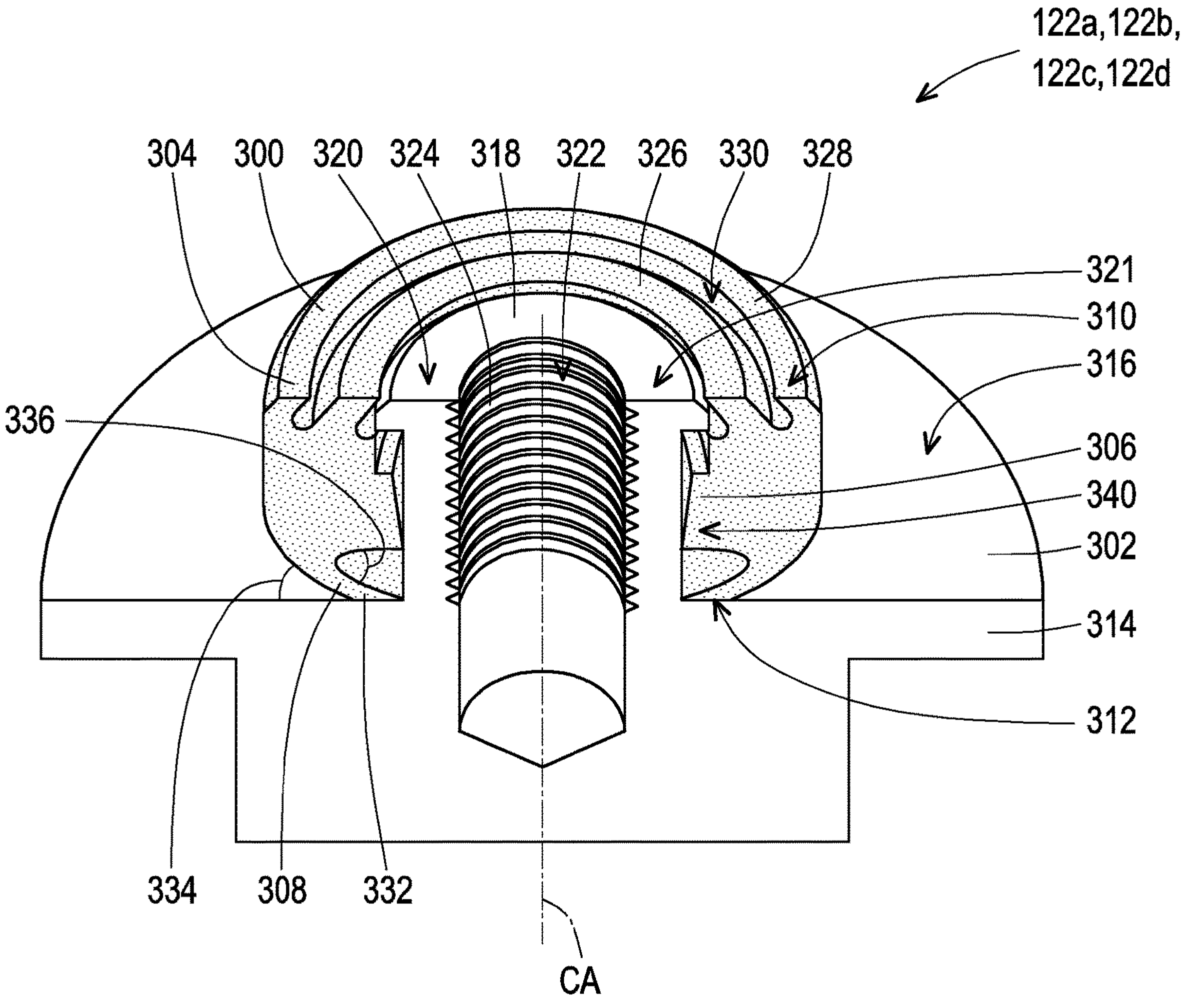
FIG. 4C is a cross-sectional, perspective view of the nozzle gasket in a deformed state and the nozzle structure taken along line B-B as shown in FIG. 4A, in accordance with some embodiments.
Figure 4D:
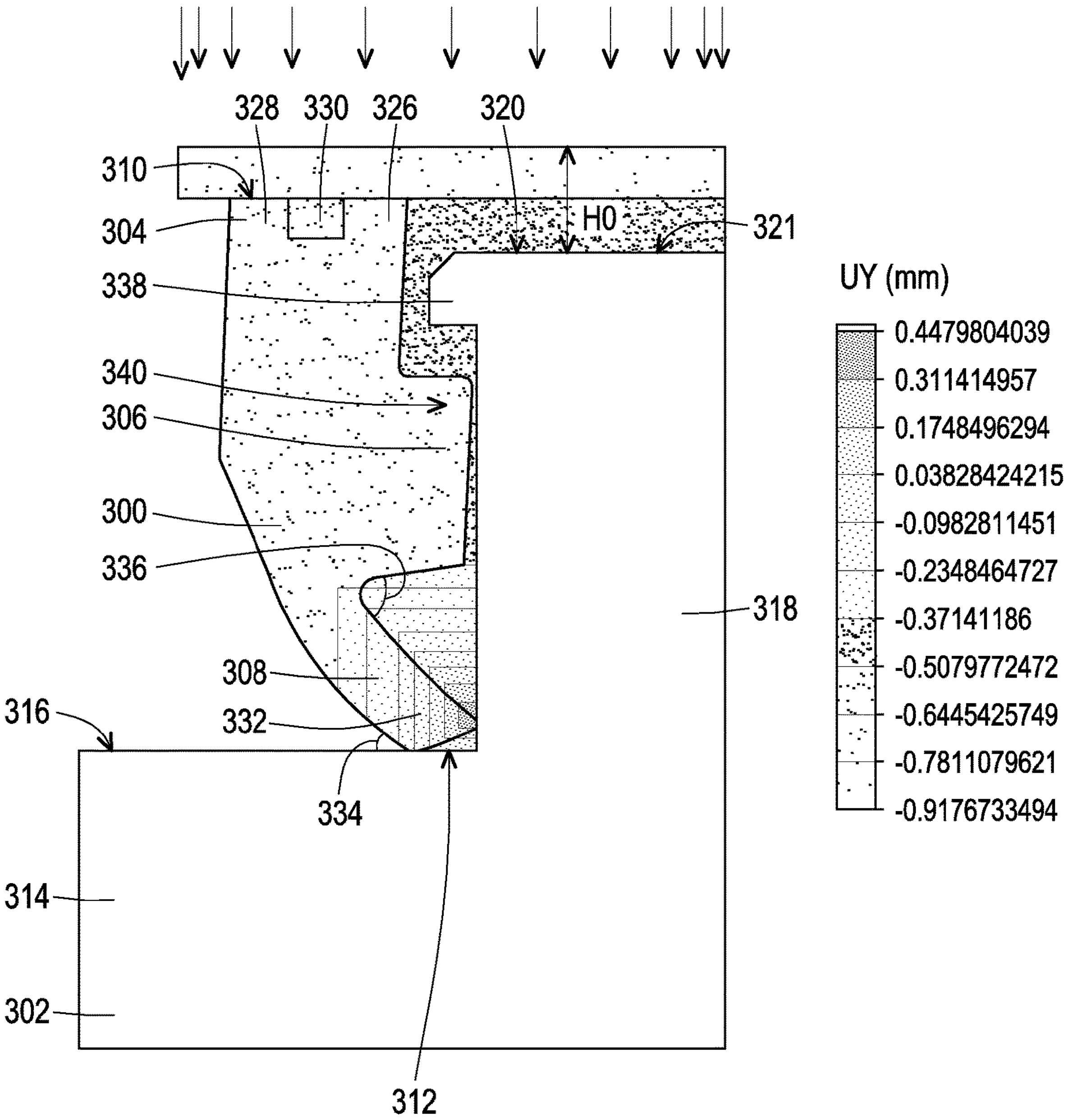
FIG. 4D is a cross-sectional, partial side view of the nozzle gasket and in a deformed state and the nozzle structure taken along line B-B as shown in FIG. 4A, in accordance with some embodiments.

FIG. 4C is a cross-sectional, perspective view of the nozzle gasket 300 and the nozzle structure 302 taken along line B-B as shown in FIG. 4A, in accordance with some embodiments. FIG. 4D is a cross-sectional, side view of the nozzle gasket 300 and the nozzle structure 302 taken along line B-B as shown in FIG. 4A, in accordance with some embodiments. The nozzle gasket 300 is in the deformed state in FIGS. 4C and 4D, which is representative of when the container 102 is present on the nozzle gasket 300 as the container is present on the reception region 106 of the purge load port 100.

When the deformable structure 308 is in the deformed state as shown in FIG. 4C, the angled portion 332 of the deformable structure 308 of the nozzle gasket 300 is pushed down by the container 102 due to the container 102 being present on the sealing structure 304 of the nozzle gasket 300. This downward force due to the weight of container 102 on the nozzle gasket 300 when the container is present on the reception region 106 of the purge load port 100 results in the angled portion 332 deforming and becoming curved as shown in FIG. 4C. When the angled portion 332 is deformed and becomes curved, the second angle 334 and the third angle 336 are reduced as compared to when the angled portion 332 is in the undeformed state as shown in FIG. 4B.

When the container 102 is present on the sealing structure 304 of the nozzle gasket 300, the mounting structure 306 is moved downward as shown in FIG. 4C due to the deformation in the angled portion 332 of the deformable structure 308. When the container 102 is present on the sealing structure 304 of the nozzle gasket 300, the sealing structure 304 is moved downward as shown in FIG. 4C due to the deformation in the angled portion 332 of the deformable structure 308. However, unlike the deformable structure 204 of the nozzle gasket 200 that is deformed and forms the seal with the container 102 when the container 102 is present on the nozzle gasket 200 as discussed earlier herein with respect to FIG. 3C, the sealing structure 304 of the nozzle gasket 300 forms a seal with the container 102 while remaining substantially undeformed as the sealing structure

304 only moves downward due to the deformation in the angled portion 332 of the deformable structure 308.

As the sealing structure 304 is at the first end 310 of the nozzle gasket 300 and the deformable structure 308 is at the second end 312 unlike the deformable structure 204 being present at the first end 206 of the nozzle gasket 200, the sealing structure 304 forms a seal with the container 102 when the container 102 is present on the reception region load port 100 instead of the deformable structure 308 unlike the nozzle gasket 200. Once the seal is formed between the nozzle gasket 300 and the container 102, the purging fluid is introduced into the internal chamber of the container. As the purging fluid is introduced into the internal chamber 104 through the first pair of nozzles 122*a*, 122*b* of the plurality of purge nozzles 122*a*, 122*b*, 122*c*, 122*d*, unlike the purging fluid passing through the deformable structure 204 of the nozzle gasket 200 as discussed above, the purging fluid only passes through the sealing structure 304 of the nozzle gasket 300 when exiting the nozzle hole 322. As is readily visible in FIGS. 3C and 4B, the sealing structure 304 is closer to the third end 320 of the nozzle 318 than the first portion 222 of the deformable structure 204 of the nozzle gasket is to the third end 218 of the nozzle 216. The sealing structure 304 being closer to the third end reduces a volume of space between the container 102 and the third end 320 of the nozzle 318, which prevents vibration, mitigates vibration, or reduces the likelihood of vibration occurring within the nozzle gasket 300 such that escaping or leaking of the purging fluid from the seal between the sealing structure 304 and the container 102 is prevented, mitigated, or reduced in likelihood of occurring relative to when the nozzle gasket 200 is utilized instead of the nozzle gasket 300.

Even if there is some vibration in the nozzle gasket 300 that may result in some small shifts in position of the container 102 when present on the sealing structure 304 of the nozzle gasket 300, the first and second seal portions 326, 328 along with the recess 330 form a stronger seal with the container relative to the seal between the first portion 222 of the deformable structure of the nozzle gasket 200. As the seal is stronger when utilizing the nozzle gasket 300 instead of the nozzle gasket 200, any escaping or leaking of the purging fluid from the seal between the sealing structure 304 and the container 102 is prevented, mitigated, or reduced in likelihood of occurring when the nozzle gasket 200 is utilized instead of the nozzle gasket 300.

In view of the above discussion, as the deformable structure 308 is present at the second end 312 of the nozzle gasket 300 unlike the deformable structure 204 being at the first end 206 of the nozzle gasket 200, the nozzle gasket 300 forms the stronger seal with the container 102 relative to the seal between the container 102 and the nozzle gasket 200. As the nozzle gasket 300 forms the stronger seal with the container 102, the nozzle gasket 300 further prevents, mitigates, or reduces the likelihood of the purging fluid escaping or leaking from the stronger seal relative to the seal formed between the deformable structure 204 of the nozzle gasket 200 and the container 102 as discussed earlier herein. Further preventing, mitigating, or reducing the likelihood of the purging fluid escaping or leaking by utilizing the nozzle gasket 300 instead of the nozzle gasket 200 reduces costs to operate or run the FAB as none or less of the purging fluid is wasted due escaping or leaking into an environment external to the container 102.

As shown in FIG. 4D, a height H0 extends from a surface 321 at the third end 320 of the nozzle 318. In this embodiment of the nozzle gasket 300 and the nozzle structure 302, the height H0 is greater than or equal to 1.8 millimeters (mm) to provide clearance. This clearance allows for the container 102 to compress the nozzle gasket 300 when positioned, loaded, or mounted on the nozzle gasket 300 while preventing damage to the nozzle 318 of the nozzle structure 302 when the container 102 is on the nozzle gasket 300. Although the above dimension is with respect to the embodiment of the nozzle gasket 300 as shown in FIG. 4D, this dimension of the height H0 may be adjusted in alternative embodiments of the nozzle gasket 300 to further prevent or reduce the likelihood of the purging or cleaning fluid escaping or leaking when utilizing the nozzle gasket 300 and the nozzle structure 302 at the plurality of purge nozzles 122*a*, 122*b*, 122*c*, 122*d* of the purge load port 100.

Figure 4E:
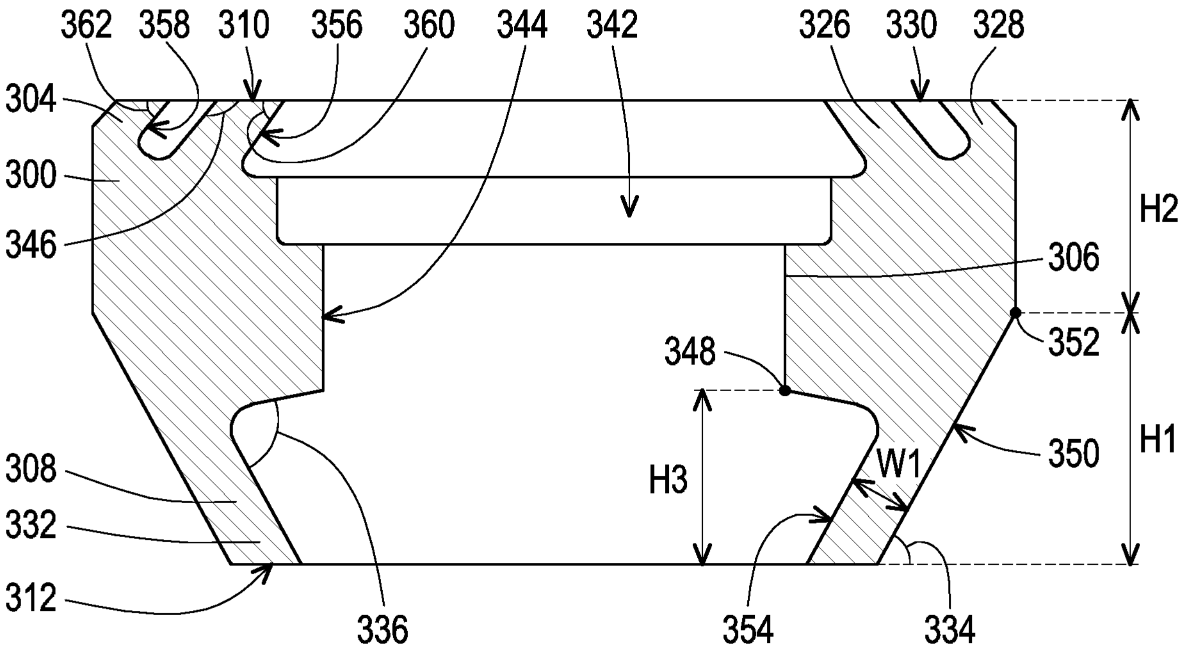
FIG. 4E is a cross-sectional, side view of the nozzle gasket in an undeformed state taken along line B-B as shown in FIG. 4A, in accordance with some embodiments.

FIG. 4E is a cross-sectional, side view of the nozzle gasket 300 when removed from the nozzle structure 302, in accordance with some embodiments. As shown in FIG. 4E, the sealing structure 304, the mounting structure 306, and the deformable structure 308 delimit a reception opening 342, which may be referred to as a through hole. The mounting structure 306 extends around the narrowest region of the reception opening 342. The reception opening 342 is configured to, in operation, receive the nozzle 318 of the nozzle structure 302.

As shown in FIG. 4E, the mounting structure 306 includes a mounting surface 344. The mounting surface 344 abuts the sidewall surface of the nozzle 318 and interlocks with the lip portion 338 to interlock the nozzle gasket 300 to the nozzle 318 when the nozzle gasket 300 is mounted to the nozzle 318 of the nozzle structure 302.

As shown in FIG. 4E, the recess 330 between the first and second seal portions 326, 328 of the sealing structure 304 is at a fourth angle 346 with respect to the first end 310, which includes a sealing surface that forms a seal with the container 102. In other words, the recess 330 extends into the first end 310 of the nozzle gasket 300 at the fourth angle 346 relative the sealing surface of the sealing structure 304 at the first end 310 of the nozzle gasket 300.

As shown in FIG. 4E, the nozzle gasket 300 includes a first point or edge 348 at a lower end of the mounting surface 344 of the mounting structure 306, an external angled surface 350 that extends from the second end 312 to a second point or edge 352, and an internal angled surface 354 that extends from the second end 312 to the mounting structure 306. A first height H1 extends from the second end 312 to the second point 352, a second height H2 extends from the second point or edge 352 to the first end 310, a third heigh H3 that extends from the second end 312 to the first point 348, and a width W1 that extends from the internal angled surface 354 to the external angled surface 350. In this embodiment of the nozzle gasket 300, the ratio of the third height H3 to the width W1 (i.e., H3/W1) may be greater than or equal to 2. In this embodiment, the first height H1 is greater than the second height H2, and the second height H2 is greater than the third height H3. In this embodiment, the first heigh H1 is greater than 2 millimeters (mm). Although the above dimensions and dimensional relationships are with respect to the embodiment of the nozzle gasket 300 as shown in FIG. 4E, these dimensional relationships may be adjusted in alternative embodiments of the nozzle gasket 300 to further prevent or reduce the likelihood of the purging or cleaning fluid escaping or leaking when utilizing the nozzle gasket 300 and the nozzle structure 302 at the plurality of purge nozzles 122*a*, 122*b*, 122*c*, 122*d* of the purge load port 100.

As shown in FIG. 4E, the first seal portion 326 includes a first inner angled surface 356, which partially delimits the nozzle reception opening 342, and the second seal portion 328 includes a second inner angled surface 358, which partially delimits the recess 330. The first inner angled surface 356 is at a fifth angle 360 with respect to the first end 310 of the nozzle gasket 300, and the second inner angled surface 358 is at a sixth angle 362 with respect to the first end 310 of the nozzle gasket 300. In this embodiment of the nozzle gasket 300, the fifth angle 360 is greater than or equal to 55 degrees, is less than or equal to 95 degrees, or is equal to an angle between 55 and 95 degrees. In this embodiment of the nozzle gasket 300, the sixth angle 362 is greater than the fifth angle 360. Although the above dimensions and dimensional relationships are with respect to the embodiment of the nozzle gasket 300 as shown in FIG. 4E, these dimensional relationships may be adjusted in alternative embodiments of the nozzle gasket 300 to further prevent or reduce the likelihood of the purging or cleaning fluid escaping or leaking when utilizing the nozzle gasket 300 and the nozzle structure 302 at the plurality of purge nozzles 122*a*, 122*b*, 122*c*, 122*d* of the purge load port 100.

As shown in FIGS. 4B and 4C, the nozzle hole 322 in this embodiment as shown in FIGS. 4B and 4C is aligned with an axis CA. In other words, a respective axis of the nozzle hole 322 is coincident with the axis CA. The axis CA is a central axis of the nozzle structure 302. In some embodiments, the axis CA of the nozzle structure may not be a central axis as it may not be coincident with a center of the nozzle structure 302 as shown in this embodiment in FIGS. 4B and 4C.

Figure 5:
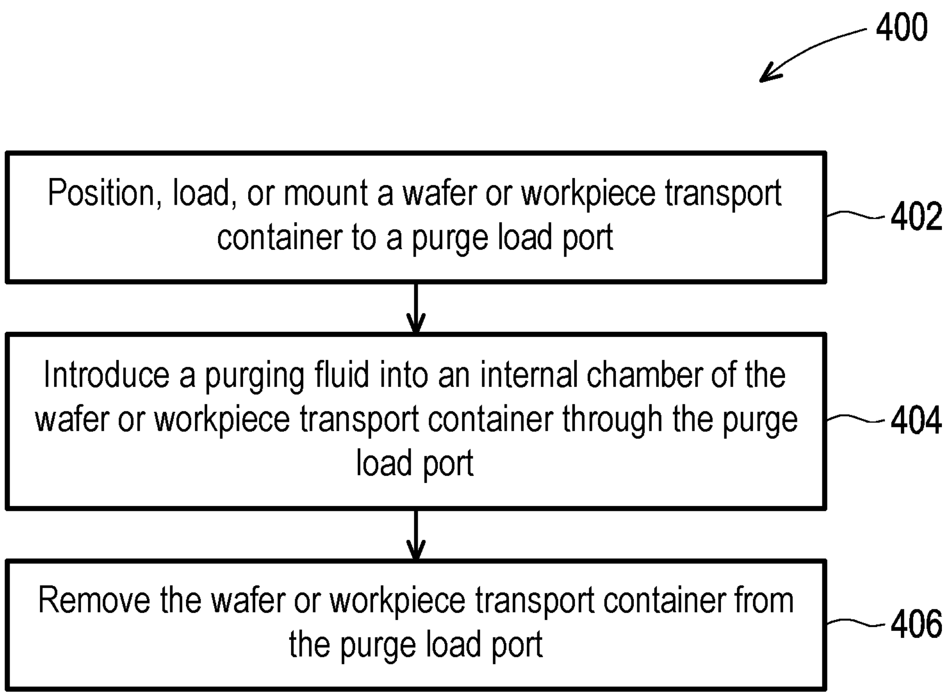
FIG. 5 is a flow chart of a method of purging a respective internal chamber of a respective container for transporting wafers or workpieces between various processing tools or locations within a FAB, in accordance with some embodiments.

FIG. 5 is a flowchart 400 of a method of purging the internal chamber 104 of the container 102 utilizing the purge load port 100 including the nozzle gasket 300 and the nozzle structure 302 being present at the plurality of purge nozzles 122*a*, 122*b*, 122*c*, 122*d*, in accordance with some embodiments. The flowchart 400 includes a first step 402, a second step 404, and a third step 406.

In the first step 402, the container 102, which contains no workpieces or wafers, is positioned, loaded, and mounted onto the purge load port 100 at the reception region 106. For example, the container 102 is transported to the purge load port by an overhead transport system (OHT) from a location within the FAB to the purge load port 100. Once the container 102 is aligned with the purge load port 100, the container 102 is lowered and positioned, loaded, and mounted onto the purge load port 100. While not shown, the container 102 includes reception structures or openings that are aligned with the guide structure 128 such that the guide structures 128 are inserted into the reception structures or openings. While not shown, the container includes respective inlets that are aligned with the first pair of nozzles 122*a*, 122*b* of the plurality of purge nozzles 122*a*, 122*b*, 122*c*, 122*d* and respective outlets that are aligned with the first pair of nozzles 122*a*, 122*b* of the plurality of purge nozzles 122*a*, 122*b*, 122*c*, 122*d* such that the respective inlets are in fluid communication with the first pair of nozzles 122*a*, 122*b* and the respective outlets are in fluid communication with the second pair of nozzles 122*c*, 122*d*. The respective inlets and the respective outlets provide access to the internal chamber 104 within the container 102 such that the purging fluid is injected into and passes through the internal chamber 104 of the container 102.

When the container 102 is positioned on the purge load port 100, respective seals are formed at each of the plurality of purge nozzles 122*a*, 122*b*, 122*c*, 122*d* by respective sealing structures 304 of the nozzle gaskets 300 at each one of the plurality of purge nozzles 122*a*, 122*b*, 122*c*, 122*d*. For example, at each one of the plurality of purge nozzles 122*a*, 122*b*, 122*c*, 122*d*, the respective first and second portions 326, 328 of each of the respective sealing structures 304 abuts or contacts a respective surface of the container forming the respective seals such that the purging fluid enters and exits the internal chamber without leaking or escaping between the container 102 and the sealing structures 304 at each one of the plurality of purge nozzles 122*a*, 122*b*, 122*c*, 122*d*. As the details of the nozzle gaskets 300 forming these seals with the container 102 were discussed earlier herein in detail, for simplicity and brevity sake of the present disclosure, this discussion of the nozzle gaskets 300 more effectively forming seals with the container than the nozzle gaskets 200 is not reproduced herein.

After the first step 402 is complete in which the container 102 is positioned, loaded, or mounted to the purge load port 100, in a second step 404 at least two of respective valves 112*a*, 112*b* of the plurality of valves 112*a*, 112*b*, 112*c* are opened such that the purging fluid from the purging or cleaning fluid source 108 is injected into and passes through the container 102. As the purging fluid passes through the internal chamber 104 of the container 102, any residual debris, contaminants, or particulates are removed from the internal chamber 104 such that the internal chamber 104 is purged and cleaned by the purging fluid. Removing the residual debris, contaminants, or particulates prevents or reduces the likelihood of defects in workpieces and wafers that are transported within the container 102 after the internal chamber 104 of the container 102 is purged and removed from the purge load port 100. In at least this embodiment, the purging fluid enters into the internal chamber 104 of the container 102 through the first pair 122*a*, 122*b* of the plurality of purge nozzles 122*a*, 122*b*, 122*c*, 122*d* and exits the internal chamber 104 of the container 102 through the second pair 122*c*, 122*d* of the plurality of purge nozzles 122*a*, 122*b*, 122*c*.

After the second step 404 is complete in which the purging fluid is injected into and through the internal chamber 104 of the container to purge and clean the internal chamber 104, in a third step 406 the at least two respective valves 112*a*, 112*b* of the plurality of valves 112*a*, 112*b* are closed to stop injecting or introducing purging fluid into and through the internal chamber 104. After the purging fluid is no longer being injected into and through the internal chamber 104, the OHT picks up the container 102 and removes the container 102 from the purge load port as the internal chamber 104 of the container is now purged and cleaned and is ready to receive workpieces or wafers to be transported throughout the FAB.

As the nozzle gaskets 300 and nozzle structures 302 present at the plurality of purge nozzles 122*a*, 122*b*, 122*c*, 122*d* prevent or reduce the likelihood of leaking or escaping of the purging fluid at the seals formed at the plurality of purge nozzles 122*a*, 122*b*, 122*c*, 122*d* with the container 102, the costs of operating or running the FAB are reduced as less purging fluid is wasted reducing waste and operating costs.

Figure 6:
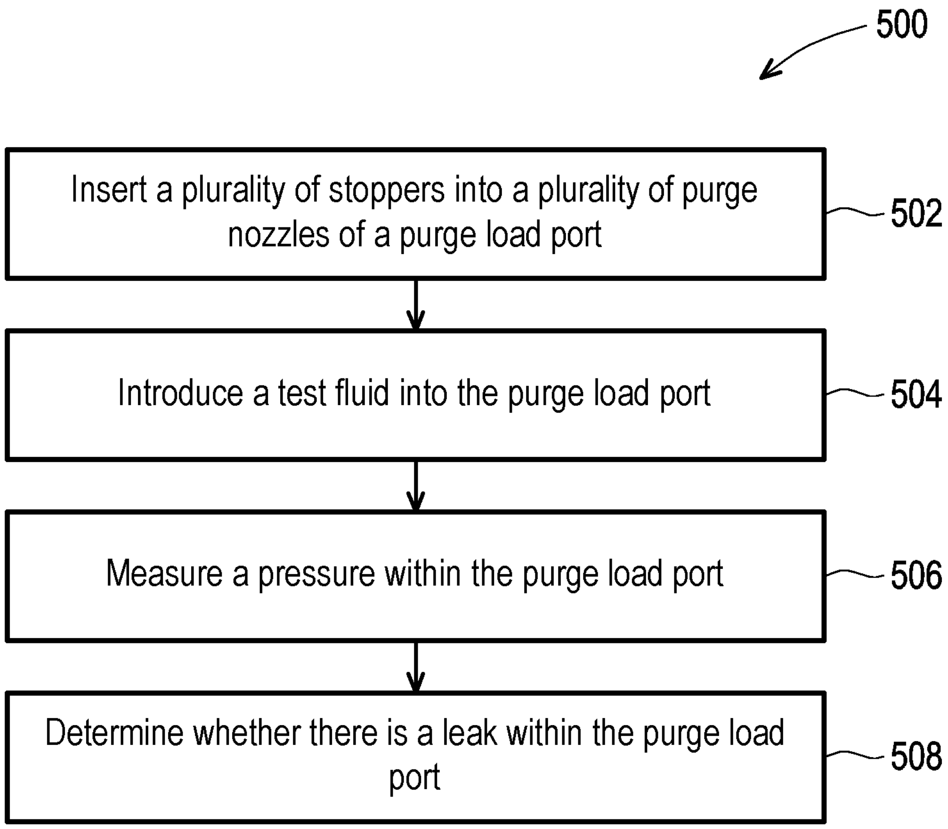
FIG. 6 is a flow chart of a method of detecting leaks within the purge load port as shown in FIG. 1, in accordance with some embodiments.

FIG. 6 is a flowchart 500 of a method of testing for leaks within the purge load port 100 including the nozzle gasket 300 and the nozzle structure 302 being present at the plurality of purge nozzles 122*a*, 122*b*, 122*c*, 122*d*, in accordance with some embodiments. The flowchart 400 includes a first step 502, a second step 504, a third step 506, and a fourth step 508. In the method in the flowchart 400, the container 102 is not present on the reception region of the purge load port 100. In other words, the container 102 is not presently positioned, loaded, or mounted on the purge load port 100.

In the first step 502, a plurality of stopper structures 510 are inserted into the nozzle holes 322 of the nozzle structures 302 at each one of the plurality of purge nozzles 122*a*, 122*b*, 122*c*, 122*d*. In this embodiment, the stopper structures 510 are threaded fasteners 510 (see FIGS. 7A and 7B) that are inserted to close off the nozzle holes 322 by threadedly engaging the threaded fasteners 510 with the threaded regions or portions 324 lining the nozzle holes 322 of the nozzle structures 302 at the plurality of purge nozzles 122*a*, 122*b*, 122*c*, 122*d*. The threaded fasteners 510 seal the nozzle holes 322 of the nozzle structures 302 at each one of the plurality of purge nozzles 122*a*, 122*b*, 122*c*, 122*d* (see FIG. 7B). In other words, in this embodiment, as there are four nozzle structures 302 as there are four purge nozzles in the plurality of purge nozzles 122*a*, 122*b*, 122*c*, 122*d*, there are four threaded fasteners 510 that are each inserted into a corresponding nozzle hole 322 of the nozzle holes 322 of the nozzle structures 302 at each one of the plurality of purge nozzles 122*a*, 122*b*, 122*c*, 122*d*.

After the first step 502 in which the plurality of stopper structure 510 are inserted into the nozzle holes 322 of the nozzle structures 302 at each one of the plurality of purge nozzles 122*a*, 122*b*, 122*c*, 122*d*, in a second step 504 a test fluid is introduced into the purge load port 100 to test for leaks within the respective fluid lines and components of the purge load port 100. For example, the solenoid valve 114 is in fluid communication with a test fluid source that provides the test fluid, and, to introduce the test fluid into the fluid lines and components of the purge load port 100, the solenoid valve 114 is opened and the plurality of valves 112*a*, 112*b*, 122 are opened to allow for the test fluid to pass through the fluid lines and the components of the purge load port 100.

After the second step 504 in which the test fluid is introduced into and through the respective fluid lines and components of the purge load port 100, in a third step 506 the respective sensors 116, 118, 124, 126 are utilized to monitor characteristics, qualities, or quantities of the test fluid in and passing through the respective fluid lines and components of the purge load port 100. After the third step 506 in which the respective sensors 116, 118, 124, 126 are utilized to monitor characteristics, qualities, or quantities of the test fluid in and passing through the respective fluid lines and components of the purge load port 100, in the fourth step 508 the measurements and data collected by the respective sensors 116, 118, 124, 126 are provided (i.e., communicated) to a controller, memory, or both (not shown) to determine whether and where there is a leak within the purge load port 100. The controller and memory then analyzes the measurements and data to determine whether there is a leak within the purge load port 100 and where the lead is located if one is occurring.

If in the fourth step 508 a leak is determined and the location of the leak is determined, a repair process may be initiated to repair the purge load port 100 to fix the leak occurring within the purge load port 100. Fixing the leak reduces waste costs and operating costs of the FAB. While a similar load test may be performed when the nozzle gasket 200 and the nozzle structure 202 are present at the plurality of purge nozzles 122*a*, 122*b*, 122*c*, 122*d*, the load test is more difficult to perform as sealing the nozzle holes 220 does not include a threaded region or portion. To seal the nozzle holes 220, press fit stopper structures (e.g., a rubber stoppers) are inserted into the nozzle holes 220 to seal the nozzle holes to perform a similar leak or load test as discussed above with respect to FIG. 6. However, it will generally be more difficult for a maintenance employee or individual to properly insert the press fit stopper structure (e.g., the rubber stoppers) as compared to threadedly engaging the stopper structure 510 with the threaded region or portion 324 lining the nozzle holes 322 when the nozzle structure 302 and the nozzle gasket 300 are present at the plurality of purge nozzles 122*a*, 122*b*, 122*c*, 122*d*. In other words, performing the load or leak test utilizing the nozzle gasket 300 and the nozzle structure 302 is easier and quicker as compared to trying to perform a similar or like load or leak test utilizing the nozzle gasket 200 and the nozzle structure 202.

Figure 7A:
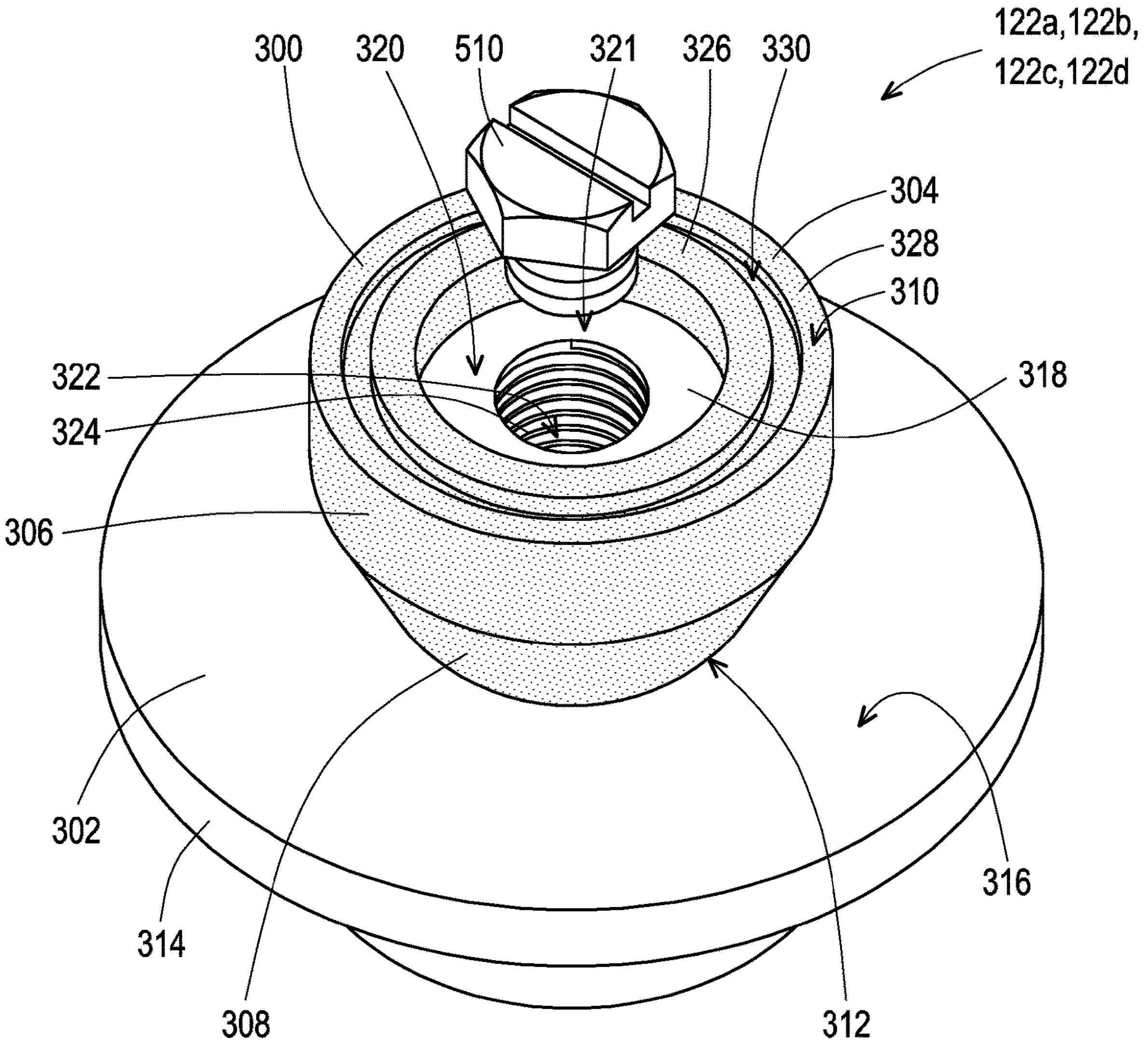
FIG. 7A is a perspective, exploded view of a fastener and the nozzle gasket and the nozzle structure as shown in FIGS. 4A-4E, in accordance with some embodiments.

FIG. 7A is a perspective, exploded view of the stopper structure 510 to be inserted into the nozzle structure 302 as shown in FIGS. 4A-4E, in accordance with some embodiments. The stopper structure 510 (i.e., the threaded fastener 510) is to be inserted into the nozzle hole 322 of the nozzle 318 of the nozzle structure 302 as discussed above with respect to the method in the flowchart 500.

Figure 7B:
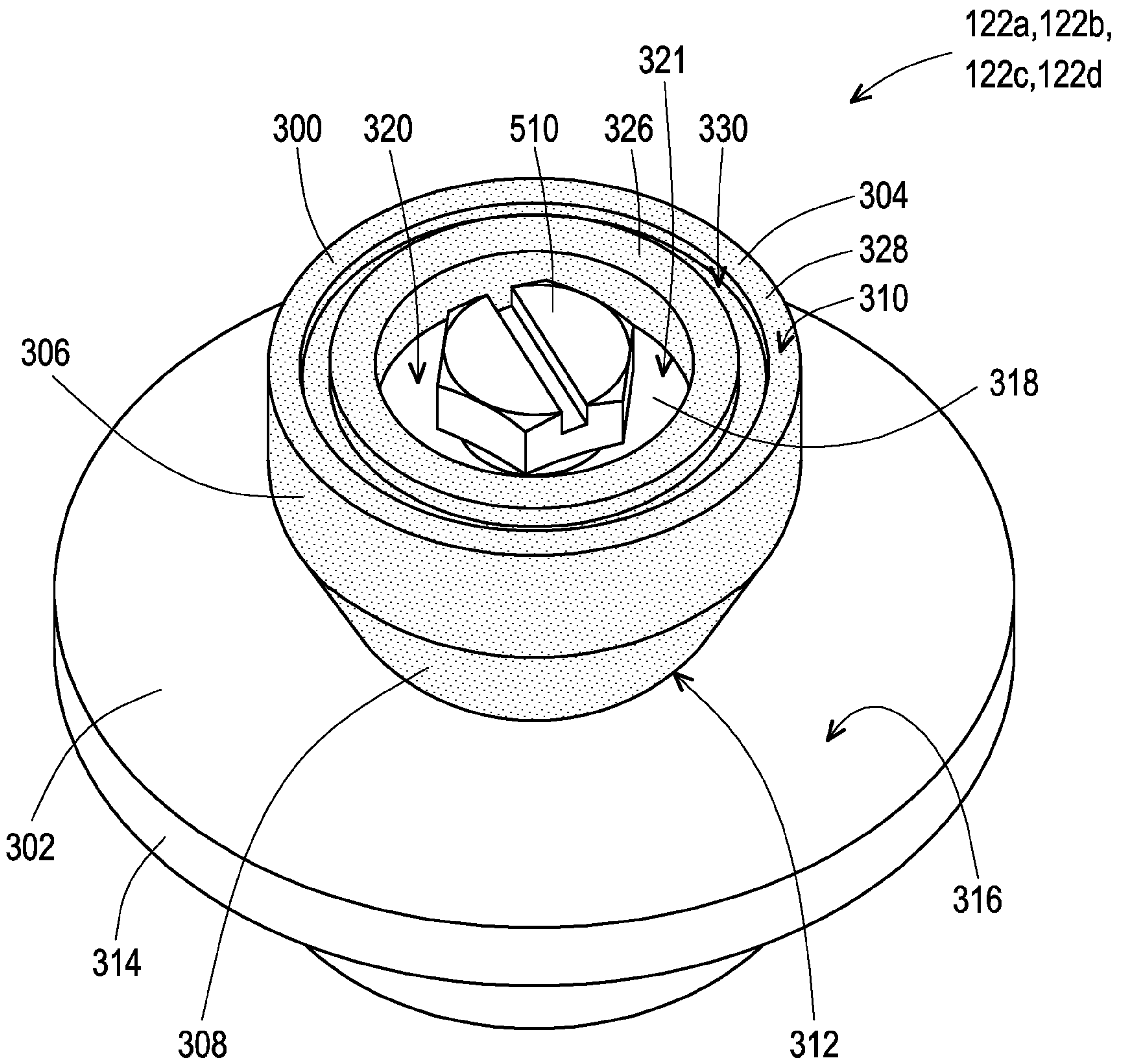
FIG. 7B is a perspective view of the fastener and the nozzles gasket and the nozzle structure as shown in FIGS. 4A-4E, in accordance with some embodiments.

FIG. 7B is a perspective view of the stopper structure 510 and the nozzle structure 302 as shown in FIGS. 4A-4E, in accordance with some embodiments. The stopper structure (i.e., the threaded fastener 510) has been inserted into the nozzle hole 322 of the nozzle 318 of the nozzle structure 302 sealing off the nozzle hole 322 of the nozzle structure 302.

The gas flow through the nozzle gasket 300 and the nozzle structure 302 may be equal to 120 LPM (liters per minute).

In view of the discussion herein, utilizing the nozzle gasket 300 and the nozzle structure 302 prevents or reduces the likelihood of escaping or leaking of purging or cleaning fluid due to a seal between the nozzle gasket 300 and the container 102 being unsealed when injecting the purging or cleaning fluid into the container 102 as compared to when the nozzle gasket 200 and the nozzle structure 202 are utilized. In other words, utilizing the nozzle gasket 300 and the nozzle structure 302 instead of the nozzle gasket 200 and nozzle structure 202 reduces waste costs and operating costs as no or less of the purging or cleaning fluid leaks or escapes. For example, the seal between the nozzle gasket 300 and the container 102 may have a reduced likelihood of becoming unsealed as the deformable structure 308 is at a lower end of the nozzle gasket 300 and does not form the seal with the container 102 whereas the deformable structure 204 of the nozzle gasket 200 is at an upper end of the nozzle gasket 200 and forms the seal with the container 102. While at the same time reducing costs due to preventing or reducing escaping or leaking of the purging or cleaning fluid, the nozzle structure 302 includes the threaded region or portion 324 that receives the stopper structure 510 (e.g., a threaded fastener) to perform a loading test to determine if any leaking is occurring within the purge load port 100 such that any leaking location can be located and fixed to reduce waste costs and operating costs of the FAB.

At least one embodiment of a nozzle gasket of the present disclosure may be summarized as including: a central axis; a first end and a second end opposite to the first end; a through hole aligned with the central axis and extending from the first end to the second end; a seal structure at the first end, the seal structure including: a first seal portion extends around the central axis; a second seal portion extends around the central axis and extends around the first seal portion; and a recess between the first seal portion and the second seal portion, the recess extends around the central axis, and the recess extends around the first seal portion; a deformation structure at the second end, the deformation structure configured to, in operation, deform when a container is placed on the seal structure.

At least one embodiment of a purge load port may be summarized as including: a nozzle structure including: a nozzle structure including: a base including a base surface; a nozzle protruding from the base surface of the base, the nozzle including an end spaced apart from the base surface of the base; a nozzle hole extending into the end of the nozzle; and a lip structure at the end of the nozzle; a nozzle gasket mounted to the nozzle structure, the nozzle gasket extends around the nozzle, and the nozzle gasket including: a first end extends past the end of the nozzle; a second end opposite to the first end, wherein the second end is at the base surface of the base; a through hole extending from the first end to the second end; a seal structure at the first end; and a deformation structure at the second end.

At least one embodiment of a method of the present disclosure may be summarized as including: positioning a container on a purge load port including: aligning a purge fluid opening of the container with a purge nozzle structure and a purge nozzle gasket; placing the container on the purge nozzle gasket sealing the purge fluid opening and bringing a nozzle purge fluid opening in fluid communication with the purge fluid opening; and deforming a deformation structure of the nozzle gasket at a base surface of a base of the purge nozzle structure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A nozzle gasket, comprising:
- a central axis;
- a first end and a second end opposite to the first end;
- a through hole aligned with the central axis and extending from the first end to the second end;
- a seal structure at the first end, the seal structure including:
  - a first seal portion extends around the central axis;
  - a second seal portion extends around the central axis and extends around the first seal portion; and
  - a recess between the first seal portion and the second seal portion, the recess extends around the central axis, and the recess extends around the first seal portion;
- a nozzle structure contact structure at least partially delimits the through hole, and the nozzle structure contact structure is configured to, in operation, contact a surface of a nozzle structure;
- a deformation structure at the second end, the deformation structure configured to, in operation, deform when a container is placed on the seal structure, wherein:
  - the seal structure delimits a first portion of the through hole,
  - the deformation structure delimits a second portion of the through hole, and
  - the nozzle structure contact structure delimits a third portion of the through hole, wherein the third portion is between the first portion and the second portion, and the third portion extends from the first portion to the second portion.

2. The nozzle gasket of claim 1, wherein the nozzle structure contact structure is configured to, in operation, interlock with a lip portion of the nozzle structure.

3. The nozzle gasket of claim 1, wherein the recess is at an angle with respect to a surface of the first seal portion.

4. The nozzle gasket of claim 1, wherein the deformation structure is at an angle with respect to a first surface of the first seal portion and a second surface of the seal annular portion.

5. The nozzle gasket of claim 4, wherein the deformation structure delimits a deformation recess that is configured to, in operation, provide clearance for the deformation structure to deform when positioning the container on the seal structure.

6. The nozzle gasket of claim 4, wherein the seal structure and the deformation structure are made of a material with a shore hardness less than or equal to 70.

7. A purge load port, comprising:
- a nozzle structure including:
- a base including a base surface;
- a nozzle protruding from the base surface of the base, the nozzle including an end spaced apart from the base surface of the base;
- a nozzle hole extending into the end of the nozzle; and
- a lip structure at the end of the nozzle;
- a nozzle gasket mounted to the nozzle structure, the nozzle gasket extends around the nozzle, and the nozzle gasket including:
- a first end extends past the end of the nozzle;
- a second end opposite to the first end, wherein the second end is at the base surface of the base;
- a through hole extending from the first end to the second end;
- a seal structure at the first end; and
- a deformation structure at the second end.

8. The purge load port of claim 7, wherein the nozzle gasket further includes:
- a central axis;
- a seal structure including:
- a first annular portion;
- a second annular portion extends around the central axis and extends around the first annular portion; and
- an annular recess between the first annular portion and the second annular portion and the annular recess extends around the first annular portion.

9. The purge load port of claim 8, wherein the deformation structure of the nozzle gasket is configured to, in operation, deform when a container is positioned on the seal structure of the nozzle gasket.

10. The purge load port of claim 9, wherein the deformation structure delimits a deformation recess that is configured to, in operation, provide clearance for the deformation structure to deform when positioning the container on the seal structure.

11. The purge load port of claim 7, wherein the nozzle gasket is made of a material with a shore hardness less than or equal to 70.

12. The purge load port of claim 7, wherein:
- the nozzle includes a sidewall transverse to the base surface of the base; and
- the nozzle gasket further includes a protrusion between the seal structure and the deformation structure, wherein the protrusion is adjacent to the sidewall of the nozzle, extends around the nozzle, and is between the lip structure and the base surface of the base.

13. The purge load port of claim 12, wherein the protrusion is configured to, in operation, abut the sidewall of the nozzle and interlock with the lip structure to prevent the nozzle gasket from being removed from the nozzle.

14. The purge load port of claim 7, wherein the nozzle hole is at least partially threaded.

15. The purge load port of claim 14, wherein the nozzle that is at least partially threaded is configured to, in operation, receive a threaded fastener to close off the nozzle hold.

16. A nozzle gasket, comprising:

a central axis;

a first end and a second end opposite to the first end;

a through hole aligned with the central axis and extending from the first end to the second end;

a seal structure at the first end, the seal structure including:

a first annular surface of a first annular portion concentric with the central axis;

a second annular surface of a second annular portion concentric with the central axis, the second annular surface surrounds the first annular surface; and an annular recess that extends between the first annular surface and the second annular surface, the annular recess separates the first annular surface from the second annular surface, the annular recess surrounds the first annular surface, and the annular recess is at an angle less than 90-degrees relative to the second annular surface;

a deformation structure at the second end, the deformation structure configured to, in operation, deform when a container is placed on the seal structure.

17. The nozzle gasket of claim 16, further comprising a mounting portion that is between the sealing structure and the deformation structure, and the mounting portion is configured to, in operation, mount the nozzle gasket to a nozzle structure.

18. The nozzle gasket of claim 16, wherein:

the seal structure delimits a first portion of the through hole, the deformation structure delimits a second portion of the through hole, and the nozzle structure contact structure delimits a third portion of the through hole, wherein the third portion is between the first portion and the second portion, and the third portion extends from the first portion to the second portion.

19. The nozzle gasket of claim 16, wherein the deformation structure delimits a deformation recess that is configured to, in operation, provide clearance for the deformation structure to deform when positioning the container on the seal structure.

20. The nozzle gasket of claim 16, wherein the seal structure and the deformation structure are made of a material with a shore hardness less than or equal to 70.

* * * * *